United States Patent
Varunjikar et al.

(10) Patent No.: US 9,540,040 B2
(45) Date of Patent: Jan. 10, 2017

(54) PHASE PLANE BASED TRANSITIONAL DAMPING FOR ELECTRIC POWER STEERING

(71) Applicant: STEERING SOLUTIONS IP HOLDING CORPORATION, Saginaw, MI (US)

(72) Inventors: Tejas M. Varunjikar, Saginaw, MI (US); Anthony J. Champagne, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 1 day.

(21) Appl. No.: 14/315,612

(22) Filed: Jun. 26, 2014

(65) Prior Publication Data

US 2015/0375779 A1 Dec. 31, 2015

(51) Int. Cl.
  *B62D 5/04* (2006.01)
  *B62D 6/00* (2006.01)
  *B62D 6/10* (2006.01)

(52) U.S. Cl.
  CPC ............. *B62D 6/008* (2013.01); *B62D 5/0463* (2013.01); *B62D 5/0472* (2013.01); *B62D 5/0484* (2013.01); *B62D 6/10* (2013.01)

(58) Field of Classification Search
  None
  See application file for complete search history.

(56) References Cited

U.S. PATENT DOCUMENTS

| | | | |
|---|---|---|---|
| 4,660,671 | A | 4/1987 | Behr et al. |
| 4,800,974 | A | 1/1989 | Wand et al. |
| 4,874,053 | A | 10/1989 | Kimura et al. |
| 5,029,466 | A | 7/1991 | Nishihara et al. |
| 5,473,539 | A | 12/1995 | Shimizu et al. |

(Continued)

FOREIGN PATENT DOCUMENTS

| | | |
|---|---|---|
| CN | 100999223 B | 7/2007 |
| CN | 101142548 A | 3/2008 |

(Continued)

OTHER PUBLICATIONS

Gillespie, T.D.; "Fundamentals of Vehicle Dynamics"; Warrendale, PA; Society of Automotive Engineers; 1992; ISBN 1560911999, 9781560911999; pp. 205-206.

(Continued)

*Primary Examiner* — Truc M Do
*Assistant Examiner* — Jess Whittington
(74) *Attorney, Agent, or Firm* — Cantor Colburn LLP

(57) ABSTRACT

A method for controlling a motor in an electrical power steering system is provided. The method generates a damping torque command for reducing an undesired torque to be generated by the motor. The method generates an assist torque command that specifies a desired torque to be generated by the motor. The method determines whether to send the damping torque command to the motor as a function of a hand wheel velocity and a hand wheel angle. The method combines the assist torque command and the damping torque command to send to the motor when it is determined that the damping torque command is to be sent to the motor.

20 Claims, 9 Drawing Sheets

(56) References Cited

U.S. PATENT DOCUMENTS

| | | | |
|---|---|---|---|
| 5,709,281 A * | 1/1998 | Sherwin | B62D 5/0466 180/169 |
| 5,919,241 A * | 7/1999 | Bolourchi | B62D 5/0466 180/443 |
| 5,927,421 A | 7/1999 | Fukada | |
| 5,948,030 A | 9/1999 | Miller et al. | |
| 5,992,557 A | 11/1999 | Nakamura et al. | |
| 6,032,091 A | 2/2000 | Noro et al. | |
| 6,152,254 A | 11/2000 | Phillips | |
| 6,223,852 B1 | 5/2001 | Mukai et al. | |
| 6,250,419 B1 | 6/2001 | Chabaan et al. | |
| 6,298,941 B1 | 10/2001 | Spadafora | |
| 6,370,459 B1 | 4/2002 | Phillips | |
| 6,425,454 B1 | 7/2002 | Chabaan et al. | |
| 6,588,541 B2 | 7/2003 | Norman et al. | |
| 6,687,590 B2 | 2/2004 | Kifuku et al. | |
| 6,742,620 B2 | 6/2004 | Eidam et al. | |
| 6,959,970 B2 | 11/2005 | Tseng | |
| 7,040,450 B2 | 5/2006 | Nagase et al. | |
| 7,558,661 B2 | 7/2009 | Sundaram et al. | |
| 7,596,441 B2 | 9/2009 | Yokota et al. | |
| 7,885,750 B2 | 2/2011 | Lu | |
| 7,954,593 B2 | 6/2011 | Dornhege et al. | |
| 7,974,754 B2 | 7/2011 | Nakatsu | |
| 7,975,801 B2 | 7/2011 | Tashiro | |
| 8,010,252 B2 | 8/2011 | Getman et al. | |
| 8,108,105 B2 | 1/2012 | Saruwatari et al. | |
| 8,165,770 B2 | 4/2012 | Getman et al. | |
| 8,219,283 B2 | 7/2012 | Recker et al. | |
| 8,548,667 B2 | 10/2013 | Kaufmann et al. | |
| 8,571,759 B2 | 10/2013 | Oblizajek et al. | |
| 8,666,605 B2 | 3/2014 | Delarche et al. | |
| 8,666,607 B2 | 3/2014 | Kojo | |
| 8,798,864 B2 | 8/2014 | Champagne et al. | |
| 8,843,276 B2 | 9/2014 | Kojo et al. | |
| 8,903,606 B2 | 12/2014 | Kleinau et al. | |
| 8,977,433 B2 | 3/2015 | Kojima | |
| 8,977,437 B2 | 3/2015 | Tamaizumi et al. | |
| 9,387,875 B2 | 7/2016 | Shimizu et al. | |
| 9,409,595 B2 | 8/2016 | Varunjikar et al. | |
| 2002/0026267 A1 | 2/2002 | Kifuku | |
| 2002/0092696 A1 | 7/2002 | Bohner et al. | |
| 2002/0177932 A1 | 11/2002 | Kifuku et al. | |
| 2002/0179362 A1 * | 12/2002 | Norman | B62D 6/008 180/446 |
| 2003/0074120 A1 * | 4/2003 | Kleinau | B62D 5/0463 701/41 |
| 2004/0024505 A1 | 2/2004 | Salib et al. | |
| 2004/0055810 A1 | 3/2004 | Chabaan | |
| 2004/0099469 A1 | 5/2004 | Koibuchi et al. | |
| 2004/0117088 A1 | 6/2004 | Dilger | |
| 2004/0262063 A1 | 12/2004 | Kaufmann et al. | |
| 2005/0189163 A1 | 9/2005 | Barton et al. | |
| 2005/0206224 A1 | 9/2005 | Lu | |
| 2005/0206229 A1 | 9/2005 | Lu et al. | |
| 2005/0246085 A1 | 11/2005 | Salib et al. | |
| 2005/0256620 A1 | 11/2005 | Kato et al. | |
| 2007/0299580 A1 | 12/2007 | Lin | |
| 2008/0147276 A1 | 6/2008 | Pattok et al. | |
| 2009/0024281 A1 * | 1/2009 | Hwang | B62D 6/008 701/42 |
| 2009/0125186 A1 | 5/2009 | Recker et al. | |
| 2009/0143938 A1 | 6/2009 | Nishimura | |
| 2009/0216407 A1 | 8/2009 | Cottard et al. | |
| 2009/0292421 A1 | 11/2009 | Williams et al. | |
| 2009/0294206 A1 | 12/2009 | Oblizajek et al. | |
| 2010/0100283 A1 | 4/2010 | Hales et al. | |
| 2010/0286869 A1 | 11/2010 | Katch et al. | |
| 2011/0022272 A1 | 1/2011 | Hung et al. | |
| 2011/0218706 A1 | 9/2011 | Mori et al. | |
| 2012/0041644 A1 | 2/2012 | Turner | |
| 2012/0199414 A1 | 8/2012 | Shimizu et al. | |
| 2012/0232754 A1 * | 9/2012 | Champagne | B62D 5/0469 701/41 |
| 2012/0261209 A1 | 10/2012 | Shiino | |
| 2013/0024072 A1 | 1/2013 | Michelis et al. | |
| 2013/0030654 A1 | 1/2013 | Oblizajek et al. | |
| 2013/0073146 A1 | 3/2013 | Konomi et al. | |
| 2013/0151066 A1 | 6/2013 | Koukes et al. | |
| 2013/0261894 A1 | 10/2013 | Kojima | |
| 2014/0005894 A1 | 1/2014 | Aoki | |
| 2014/0257641 A1 | 9/2014 | Champagne et al. | |
| 2014/0324294 A1 | 10/2014 | Champagne | |
| 2015/0191200 A1 | 7/2015 | Tsubaki et al. | |
| 2016/0288825 A1 | 10/2016 | Varunjikar et al. | |

FOREIGN PATENT DOCUMENTS

| | | |
|---|---|---|
| CN | 101522504 | 9/2009 |
| CN | 101734277 A | 6/2010 |
| CN | 102556065 A | 7/2012 |
| CN | 102806942 A | 12/2012 |
| CN | 102917939 A | 2/2013 |
| CN | 102556152 A | 7/2013 |
| DE | 19634728 C1 | 4/1998 |
| DE | 10344279 A1 | 4/2004 |
| DE | 102008051552 A1 | 4/2009 |
| DE | 102008036001 A1 | 2/2010 |
| EP | 0353995 A2 | 2/1990 |
| EP | 1508495 A2 | 2/2005 |
| EP | 1623907 A1 | 2/2006 |
| EP | 1995150 A2 | 11/2008 |
| EP | 2028080 A1 | 2/2009 |
| EP | 1808359 B1 | 4/2009 |
| EP | 2184218 A2 | 5/2010 |
| EP | 2275323 A1 | 1/2011 |
| EP | 2223838 B1 | 11/2011 |
| EP | 2492168 A1 | 8/2012 |
| EP | 2497698 A1 | 9/2012 |
| GB | 2454788 A | 5/2009 |
| JP | 2001106099 | 4/2001 |
| JP | 2003002222 A | 1/2003 |
| JP | 3712876 B2 | 11/2005 |
| JP | 2006143151 | 6/2006 |
| JP | 3819261 B2 | 9/2006 |
| JP | 2006248250 A | 9/2006 |
| JP | 2009051292 A | 9/2006 |
| JP | 2007514602 A | 6/2007 |
| JP | 2009006985 | 1/2009 |
| JP | 2006248250 A | 3/2009 |
| JP | 2011051409 A | 3/2011 |
| KR | 2006083578 A | 7/2006 |
| WO | 2005097577 A1 | 10/2005 |
| WO | 2011148240 A1 | 12/2011 |
| WO | WO2012066704 A1 | 5/2012 |
| WO | 2012176553 A1 | 12/2012 |

OTHER PUBLICATIONS

European Search Report for Application No. 14166178.5 dated Aug. 22, 2014; 7 pages.

Van der Jagt, Pim; "Prediction of Steering Efforts During Stationary or Slow Rolling Parking Maneuvers"; Ford Forschungszentrum Aachen GmbH.; Oct. 27, 1999; 20 pages.

Ansgar Rehm, Vehicle Velocity Estimation by Dynamic Inversion of Wheel Force Generation; Control Conference (ECC), 2009 European Year 2009; pp. 4798-4803.

English Translation of Chinese Office Action for related CN Application No. 201210584161; Issued Dec. 3, 2014; 15 pages.

English Translation of Chinese Office Action for related CN Application No. 201210586416.7; Issued Aug. 12, 2015; 14 pages.

English Translation of CN Office Action & Search Report for related CN Application No. 201410086920.X; Issued Nov. 5, 2015; 10 pages.

Extended EP Search Report for related EP Application No. 12192967.3, dated Apr. 2, 2013; 8 pages.

Extended European Search Report for related EP Application No. 14156987.1; dated Jan. 21, 2015; 8 pages.

Extended European Search Report for related EP Application No. 15173865.5; dated Nov. 23, 2015; 10 pages.

(56) References Cited

OTHER PUBLICATIONS

Peroutka, et al., Design Considerations for Control of Traction Drive with Permanent Magnet Synchronous Machine; Power Electronics and Motion Control Conference, 2008, EPE-PEMC 2008, 13th Year: 2008; pp. 1529-1534, DOI: 10.1109/EPEPEMC.2008.4635484.
Pornsarayouth, S., et al., Sensor Fusion of Delay and Non-delay Signal using Kalman Filter with Moving Covariance, Robotics and Biomimetics, 2008, ROBIO 2008, IEEE International Conference on: Year 2009; pp. 2045-2049, DOI: 10.1109/ROBIO.2009.4913316.
Wilhelm, et al., Friction Compensation Control for Power Steering, Control Systems Technology, IEEE Transactions on; Year: 2015, vol. PP, Issue: 99; pp. 1-14, DOI:10.1109/TCST.2015.2483561.
D.I. Katzourakis, et al.; "Steering force-feedback for human machine interface automotive experiments"; IEEE Trans. Instrum. Meas., vol. 60, No. 1, pp. 32-43, Jan. 2011.
European Search Report for Application No. EP14192466.2 dated Apr. 9, 2015.
J.C.F. de Winter, et al.; "A two-dimensional weighting function for a driver assistance system"; IEEE Trans. Syst., Man, Cybern. B, Cybern., vol. 38, No. 1, pp. 189-198, Feb. 2008.
Road-Departure Prevention in an Emergency Obstacle Avoidance Situation; Katzourakis, D.I., et al.; Systems, Man, and Cybernetics: Systems, IEEE Transactions on; vol. 44, Issue 5; DOI: 10.1109/TSMC.2013.2263129; Publication Year 2014, pp. 621-629.
English Translation of CN Office Action & Search Report for related CN Application No. 2014110331120.X; Issued Nov. 30, 2015; 9 pages.
Extended EP Search report from related Application No. 151845443-1755: Mail date: Mar. 14, 2016; 7 pages.
Chinese Office Action for related Chinese Application No. CN201410086920.X, dated May 23, 2016, 8 pages.
CN Patent Application No. 201210586416.7 4th Office Action Issued on Sep. 21, 2016, 8 pages.
English Translation of Chinese Office Action for related CN Application No. 201410643844.8; Issued Aug. 22, 2016; 26 pages.
HSU, Yung-Hsiang Judy, "Estimation and Control of Lateral Tire Forces using Steering Torque"; Dissertaion of Stanford University, Mar. 2009; 191 pages.

\* cited by examiner

PHASE PLANE BASED TRANSITIONAL DAMPING FOR ELECTRIC POWER STEERING

BACKGROUND OF THE INVENTION

In a typical electric power steering (EPS) system of a vehicle, a hand wheel torque sensor is used to determine the driver requested assist torque. When the hand wheel torque sensor becomes faulty and does not function properly, the EPS system may not be able to provide the assist torque. In some cases, the vehicle is also put in a Limp Home mode, in which the vehicle operates in a limited fashion, when the hand wheel torque sensor becomes degraded. Accordingly, it is desirable to have an EPS system that better handles a situation of a degraded hand wheel torque sensor.

In an electric power steering (EPS) system, the assist torque provided by a motor typically reduces the steering effort by a driver. In certain situations, such as when a torque sensor that is used to determine the driver requested assist torque degrades, the assist torque is instantly switched off. When the EPS system stops providing the assist torque, there is a possibility of a sudden perceptible change that the driver may feel on the hand wheel torque. This is because an instantaneous removal of the assist torque allows the stored energy in the system to back-drive the motor with some velocity. It is therefore desirable to provide an EPS system that handles this stored energy and eliminate the sudden perceptible change on the hand wheel.

SUMMARY OF THE INVENTION

In one embodiment of the invention, a method for controlling a motor in an electrical power steering system is provided. The method generates a damping torque command to send to the motor for reducing an undesired torque. The method generates an assist torque command that specifies a desired torque to be generated by the motor. The method determines whether to send the damping torque command to the motor as a function of a hand wheel velocity and a hand wheel angle. The method combines the assist torque command and the damping torque command to send to the motor when it is determined that the damping torque command is to be sent to the motor.

In another embodiment of the invention, a system of a vehicle comprises a control module and a power steering system that includes a motor. The control module is configured to generate a damping torque command to send to the motor for reducing an undesired torque. The control module is further configured to generate an assist torque command that specifies a desired torque to be generated by the motor. The control module is further configured to determine whether to send the damping torque command to the motor based on as a function of a hand wheel velocity and a hand wheel angle. The control module is further configured to combine the assist torque command and the damping torque command to send to the motor when it is determined that the damping torque command is to be sent to the motor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
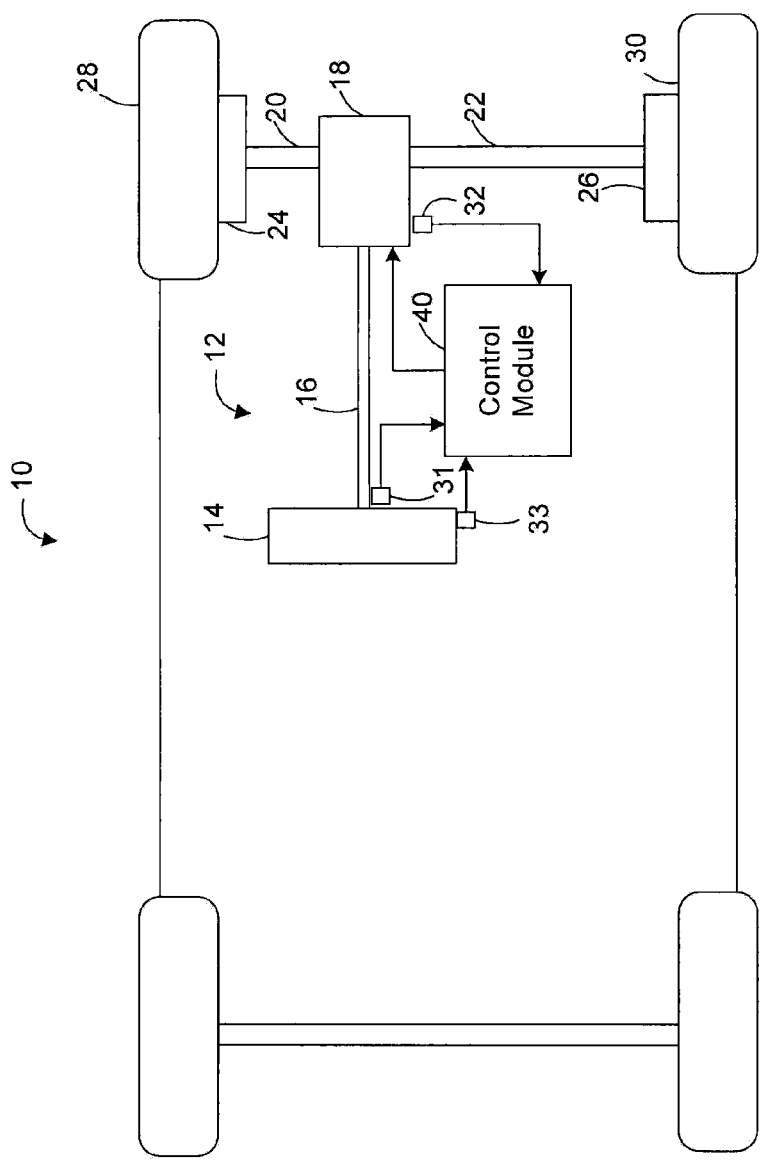
FIG. 1 illustrates a functional block diagram of a steering system that includes an assist torque calculation system in accordance with exemplary embodiments of the invention.

The following description is merely exemplary in nature and is not intended to limit the present disclosure, its application or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator (driver), the motor of the steering assist unit 18 provides the assistance to move the tie rods 20, 22 which in turn moves steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure includes various controlled steering systems including, but not limited to, steering systems with hydraulic configurations, and steer by wire configurations.

As shown in FIG. 1, the vehicle 10 further includes various sensors 31-33 that detect and measure observable conditions of the steering system 12 and/or of the vehicle 10.

The sensors 31-33 generate sensor signals based on the observable conditions. In various embodiments, the sensors 31-33 include, for example, a hand wheel velocity sensor, a hand wheel angle sensor, a lateral acceleration sensor, a yaw rate sensor, roadway wheel velocity sensors, a vehicle velocity sensor, and other sensors. The sensors 31-33 send the signals to the control module 40.

In various embodiments, a control module 40 controls the operation of the steering system 12 and/or the vehicle 10. For instance, the control module 40 controls the motor of the steering assist unit 18 to generate assist torque requested by the driver of the vehicle 10. In a normal mode of the motor operation, the control module 40 generates a normal assist torque command based on, e.g., a hand wheel torque signal from a hand wheel torque sensor and sends the normal assist torque command to the motor. In a limited assist mode, to which the control module 40 of some embodiments transitions when certain abnormality is detected (e.g., degraded functioning of a hand wheel torque sensor), the control module 40 generates and sends a limited assist torque command (e.g., based on sensor signals other than the sensor signal from a degraded sensor). In a manual mode, to which the control module 40 of some embodiments transitions when the control module 40 determines that no assist torque should be generated by the motor (e.g., degraded functioning of one or more sensors 31-33 is detected), the control module 40 directs the motor not to generate any assist torque. In some embodiments, these commands are signals representing amount of torque to be generated by the motor.

Generally speaking, the method in various embodiments of the invention generates a damping torque command that damps the reaction torque as the motor is driven by the energy built up in the steering system 12 during the transitions between different modes of operations, so as to prevent an abrupt change in the reaction torque at the steering wheel. Specifically, in some embodiments, the control module 40 switches on and off (e.g., enables or disables) the damping torque command based on a phase plane with axes being the values of a hand wheel velocity and a hand wheel angle or position. The phase plane defines the relationship between the velocity of the hand wheel 14 and the angle of the hand wheel 14. That is, the phase plane defines the relationship between the angle or position of the hand wheel and the magnitude and direction of a movement of the hand wheel.

Figure 2:
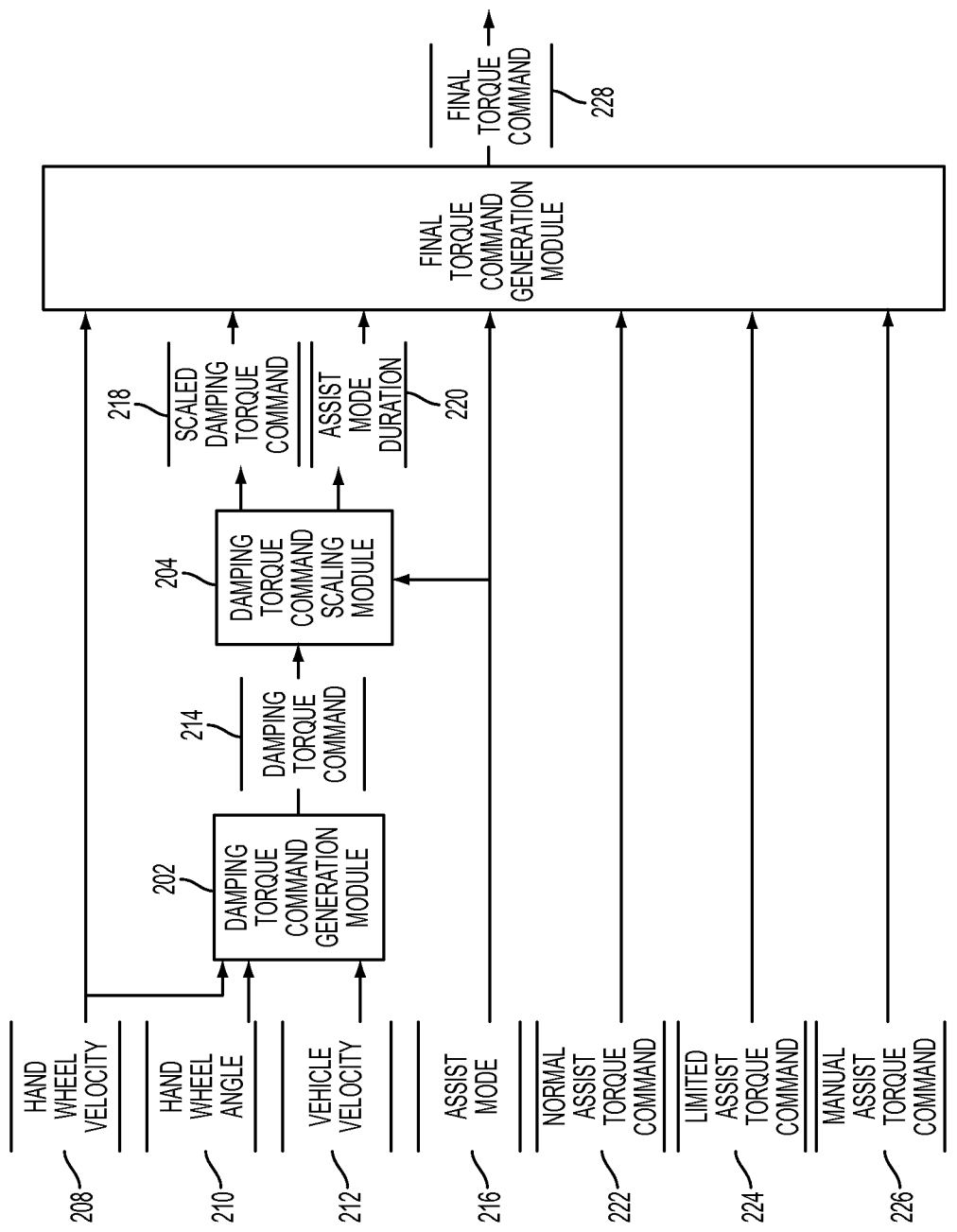
FIG. 2 illustrates a dataflow diagram illustrating an assist torque calculation system in accordance with exemplary embodiments of the invention.

FIG. 2 depicts a block diagram of the control module 40 of FIG. 1 that controls the steering system 12 and/or the vehicle 10 of FIG. 1 in accordance with some embodiments of the invention. The control module 40 includes one or more sub-modules and datastores such as a damping torque command generation module 202, a damping torque command scaling module 204, and a final torque command generation module 206.

The damping torque command generation module 202 generates a damping torque command 214 based on a hand wheel velocity signal 208, a hand wheel angle signal 210, and optionally a vehicle velocity signal 212. More specifically, in some embodiments, the damping torque command generation module 202 determines a damping gain and scales the damping gain with the motor velocity. For instance, the damping gain is multiplied by the motor velocity. The damping torque command generation module 202 determines a damping factor that is used to scale the damping gain further. The damping torque command generation module 202 determines the damping factor based on a phase plane or a coordinate plane with axes being the values of the hand wheel velocity and the hand wheel angle. As the hand wheel velocity represents the rotational direction and the magnitude of a movement of the hand wheel and the hand wheel angle represents the angle or position of the hand wheel with respect to the center position of the hand wheel, the phase plane defines the relationship between the hand wheel velocity and the hand wheel angle. In some embodiments, the damping factor that is determined based on the phase plane indicates whether the whole damping gain should be used or none of the damping gain should be used. For instance, the damping factor is zero or one and is multiplied by the product of the damping gain and the hand wheel velocity. In some embodiments, the damping torque command generation module 202 may employ one or more filters (not shown) to filter the hand wheel velocity signal 208 and the hand wheel angle signal 210 for determining the damping gain.

In some embodiments, the damping torque command generation module 202 determines the damping factor further based on the vehicle velocity. In these embodiments, the damping factor is also a function of the vehicle velocity. That is, in addition to indicating whether the whole damping gain should be used or not, the damping factor generated based on the vehicle velocity may indicate or specify a portion of the damping gain that should be used. More details about the damping torque command generation module 202 will be described further below by reference to FIG. 3.

The damping torque command scaling module 204 takes as inputs the damping torque command 214 generated by the damping torque command generation module 202 and an assist mode 216. The assist mode 216 is a signal that indicates an assist mode—e.g., the normal assist mode, the limited assist mode, and the manual mode. The damping torque command scaling module 204 time-scales the damping torque command 214 based on the duration of time since the assist mode 216 changes from one assist mode to another assist mode. The damping torque command scaling module 204 generates a scaled damping torque command 218 and an assist mode duration 220. More details about the damping torque command scaling module 204 will be described further below by reference to FIG. 8.

The final torque command generation module 206 generates a final torque command 228 to send to the motor of the steering system 12 (FIG. 1). More specifically, according to the assist mode indicated by the assist mode signal 216, the final torque command generation module 206 switches between a normal assist torque command 222, a limited assist torque command 224, and a manual assist torque command 226 to send as the final torque command 228. The manual assist torque command directs the motor not to generate any assist torque. Moreover, the final torque command generation module 206 combines the scaled damping torque command 218 into the final torque command 228 based on whether a transition between different assist modes is completed. More details about the final torque command generation module 206 will be described further below by reference to FIG. 10.

As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly calculate assist torque. As can be appreciated, the sub-modules shown in FIG. 2 can be implemented as a single control module 40 or multiple control modules. Inputs to the control module 40 can be generated from the sensors of the vehicle 10 (FIG. 1), can be modeled within the control module 40 (e.g., by other sub-modules (not shown)), can be received from other control modules (not shown), and/or can be predefined. For instance, the assist mode signal 216, the normal assist torque command 222, and the limited assist torque command 224 are generated by other sub-modules (not shown) of the control module 40 of some embodiments.

Figure 3:
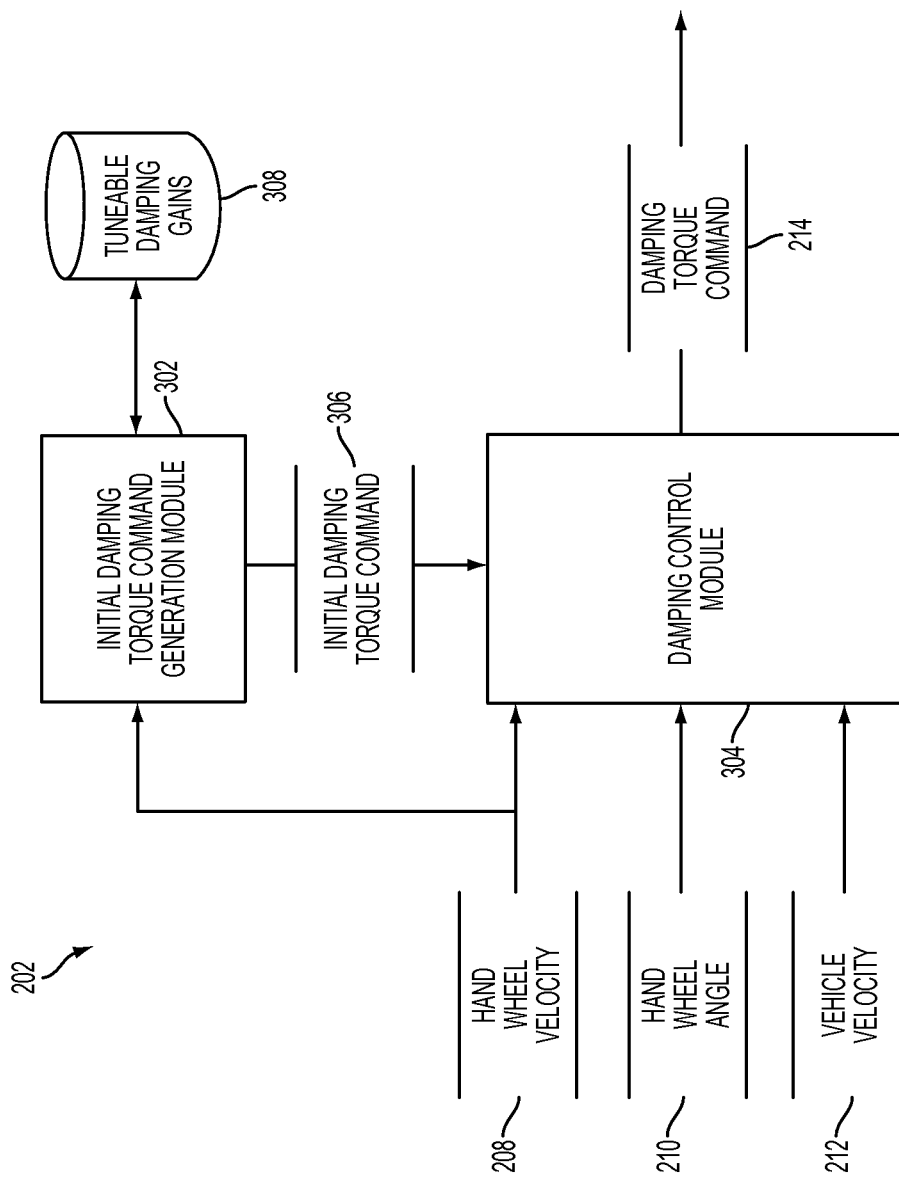
FIG. 3 illustrates a block diagram of a damping torque command generation module in accordance with exemplary embodiments of the invention.

FIG. 3 depicts a block diagram of the damping torque command generation module 202 of FIG. 2 in accordance with some embodiments of the invention. The damping torque command generation module 202 includes one or more sub-modules and datastores such as an initial damping torque command generation module 302, a damping control module 304, and tunable damping gains datastore 308.

The initial damping torque command generation module 302 generates an initial damping torque command 306 based on the hand wheel velocity signal 208. Specifically, in some embodiments, the damping torque command generation module 302 identifies a damping gain value that represents an amount of damping torque tuned for the steering system 12 and/or the vehicle 10. The initial damping torque command generation module 302 generates the initial damping torque command 306 by multiplying the identified tunable gain value by the hand wheel velocity 208.

The damping control module 304 determines whether to use or not to use the initial damping torque command 306 (i.e., whether to damp or not to damp the reaction torque) based on the relationship between the rotational direction of the hand wheel 14 (FIG. 1) and the angle of the hand wheel 14. Specifically, in some embodiments, the damping control module 304 switches on and off the initial damping torque command 306 based on a phase plane with axes being the values of the hand wheel velocity and the hand wheel angle. The damping control module 304 generates a damping factor based on the plot of a hand wheel velocity value and a hand wheel angle value and applies the damping factor to the initial damping torque command 306. For instance, the damping control command 304 multiples the initial damping torque command 306 by the damping factor to generate the damping torque command 214. Then, the damping torque command 214 may be expressed as:

damping torque command 214=(identified damping gain)×(hand wheel velocity 208)×(damping factor)

Figure 4:
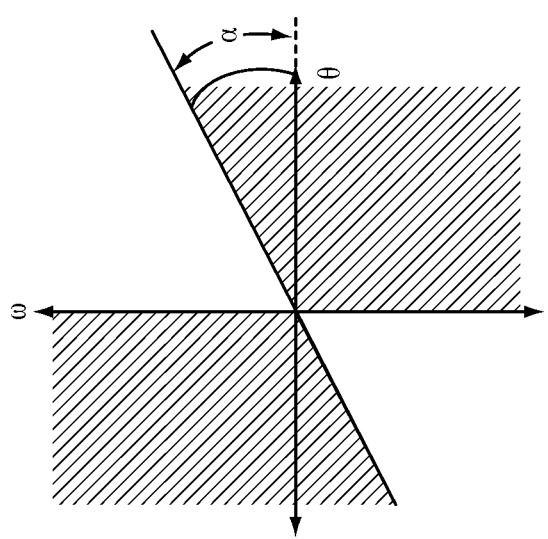
FIGS. 4-6 illustrate a phase plane with a hand wheel angle at the horizontal axis and a hand wheel velocity at the vertical axis in accordance with exemplary embodiments of the invention.

In some embodiments, the damping control module 304 determines the damping factor based on a phase plane that is defined by the following pseudo code 1:

if (($\theta$ > 0) and ($\omega$ > $\theta$ × tan $\alpha$)) or(($\theta$ < 0) and ($\omega$ < $\theta$ × tan $\alpha$))
    damping_factor = 0;
    Otherwise
    damping_factor = 1;

where damping_factor is the damping factor, $\theta$ is the hand wheel angle or angle, $\omega$ is the hand wheel velocity, and $\alpha$ is a tunable phase plane angle. The phase plane angle $\alpha$ is tuned for the steering system 12 and/or the vehicle 10 and defines an area in a phase plane as will be described below FIG. 4 illustrates a phase plane with the hand wheel angle $\theta$ at the horizontal axis and the hand wheel velocity co at the vertical axis. The right half of the phase plane (i.e., the right side of the vertical axis) is represented by positive values of the hand wheel angle (e.g., when the hand wheel has turned clockwise with respect to the center angle (zero) of the hand wheel). The left half of the phase plane (i.e., the left side of the vertical axis) is represented by negative values of the hand wheel angle (e.g., when the hand wheel is turned to the left with respect to the center angle of the hand wheel). The top half of the phase plane is represented by positive values of the hand wheel velocity (e.g., handle is being turned clockwise). The bottom half of the phase is represented by negative values of the hand wheel velocity (e.g., hand wheel is being turned counterclockwise). The shaded area of the phase plane indicates the pairs of hand wheel velocity and hand wheel angle values for which the damping factor is set to one (i.e., damp on). The unshaded area of the phase plane indicates the pairs of hand wheel velocity and hand wheel angle values for which the damping factor is set to zero (i.e., damp off). As shown in FIG. 4, more than a half of the phase plane is shaded because the tunable phase plane angle $\alpha$ is greater than zero.

Figure 5:
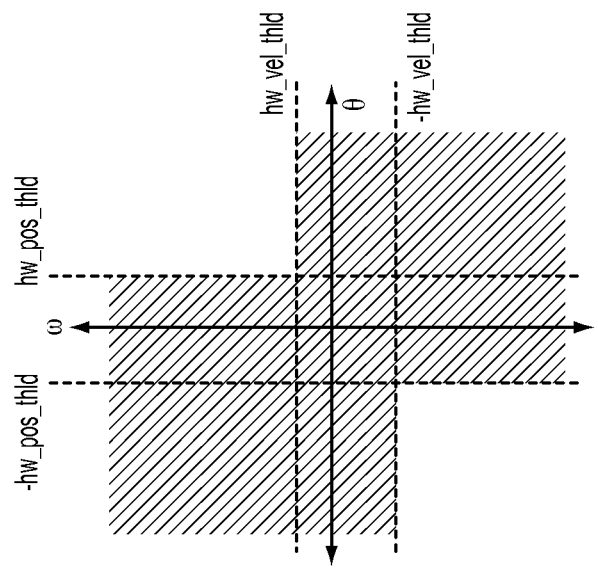

Alternatively, the damping control module 304 determines the damping factor based on a phase plane that is defined by the following pseudo code 2:

if (($\theta$ > hw_pos_thld) and ($\omega$ > hw_vel_thld)) or(($\theta$ < -hw_pos_thld) and ($\omega$ < -hw_vel_thld))
    damping_factor = 0;
    Otherwise
    damping_factor = 1;

where hw_pos_thld is a hand wheel angle threshold and hw_vel_thld is a hand wheel velocity threshold. FIG. 5 illustrates the phase plane illustrated in FIG. 4. However, the portions of the phase plane occupied by the shaded area in FIG. 5 are different than the portions of the phase plane occupied by the shaded area in FIG. 4. The shaded area of the phase plane in FIG. 5 also indicates the pairs of hand wheel velocity and hand wheel angle values for which the damping factor is set to one. The unshaded area of the phase plane indicates the pairs of hand wheel velocity and hand wheel angle values for which the damping factor is set to zero. As shown in FIG. 5, more than a half of the phase plane is shaded.

Figure 6:
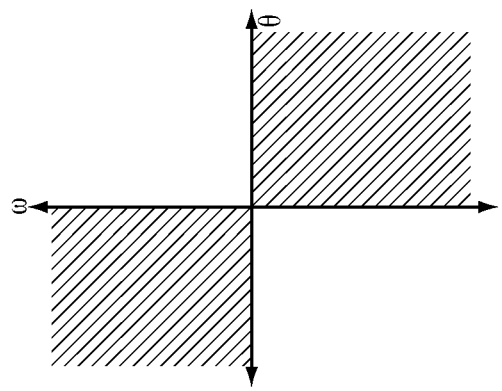

FIG. 6 illustrates the phase plane illustrated in FIGS. 4 and 5. The shaded area shown in FIG. 6 may be defined by the following pseudo code 3:

if (($\theta$ > 0) and ($\omega$ > 0)) or(($\theta$ < 0) and ($\omega$ < 0))
    damping_factor = 0;
    Otherwise
    damping_factor = 1;

As can be appreciated, the pseudo code 3 is a special case of the pseudo codes 1 and 2, which is when the tunable phase angle $\alpha$ for the pseudo code 1 is zero and the hand wheel angle threshold value and the hand wheel velocity threshold value for the pseudo code 2 are zero. A half of the phase plane is shaded in FIG. 6.

Referring to FIG. 3, the damping control module 304 of some embodiments determines the damping factor further based on the vehicle velocity 212. Specifically, when the damping factor is not permanently set to one (i.e., damp on), the damping control module 304 makes the damping factor a function of the vehicle velocity. That is, for the unshaded area of the phase plane shown in FIGS. 4 and 5, the damping factor is not set to zero but instead set to a value determined based on the vehicle velocity. Accordingly, the pseudo code 1 may be re-written as the following pseudo code 4:

```
if ((θ > 0) and (ω > θ × tan α)) or((θ < 0) and (ω < θ × tan α))
    damping_factor = f(vehicle_vel);
        Otherwise
    damping_factor = 1;
``` where vehicle_vel is the vehicle velocity, and f(vehicle_vel) is a function that outputs a value between zero and one in some embodiments. Likewise, the pseudo code 2 may be re-written as the following pseudo code 5:

```
if ((θ > hw_pos_thld) and (ω > hw_vel_thld)) or((θ
    < -hw_pos_thld) and (ω < -hw_vel_thld))
    damping_factor = f(vehicle_vel);
        Otherwise
    damping_factor = 1;
```

It is to be noted that the phase plane illustrated in FIG. 6, which corresponds to the pseudo code 3 is a special case of the pseudo codes 4 and 5 which is when f(vehicle_vel) returns zero.

Figure 7:
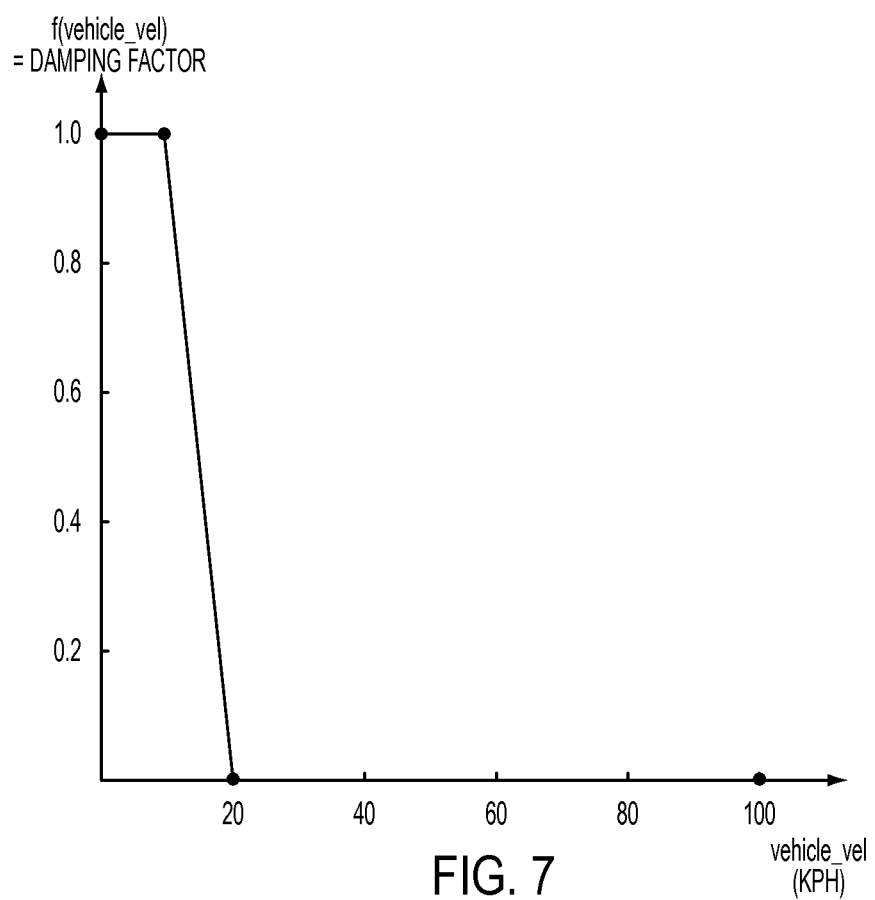
FIG. 7 illustrates a graph that plots an example function in accordance with exemplary embodiments of the invention.

FIG. 7 illustrates a graph that plots an example of the function f(vehicle_vel). As shown, the output damping factor is at one (i.e., damp on) for a vehicle velocity that is below a first vehicle velocity threshold (e.g., below about ten kilometers per hour (kph) as shown). The damping factor is at zero (i.e., damp off) for a vehicle velocity that is above a second vehicle velocity threshold (e.g., above about 20 kph as shown). Between the first and second thresholds, the damping factor decreases from one to zero. In FIG. 7, the output damping factor changes linearly as the vehicle velocity increases from the first vehicle velocity threshold to the second vehicle velocity threshold. However, other non-linear function may define the output damping factor's decrease between the two velocity thresholds.

Figure 8:
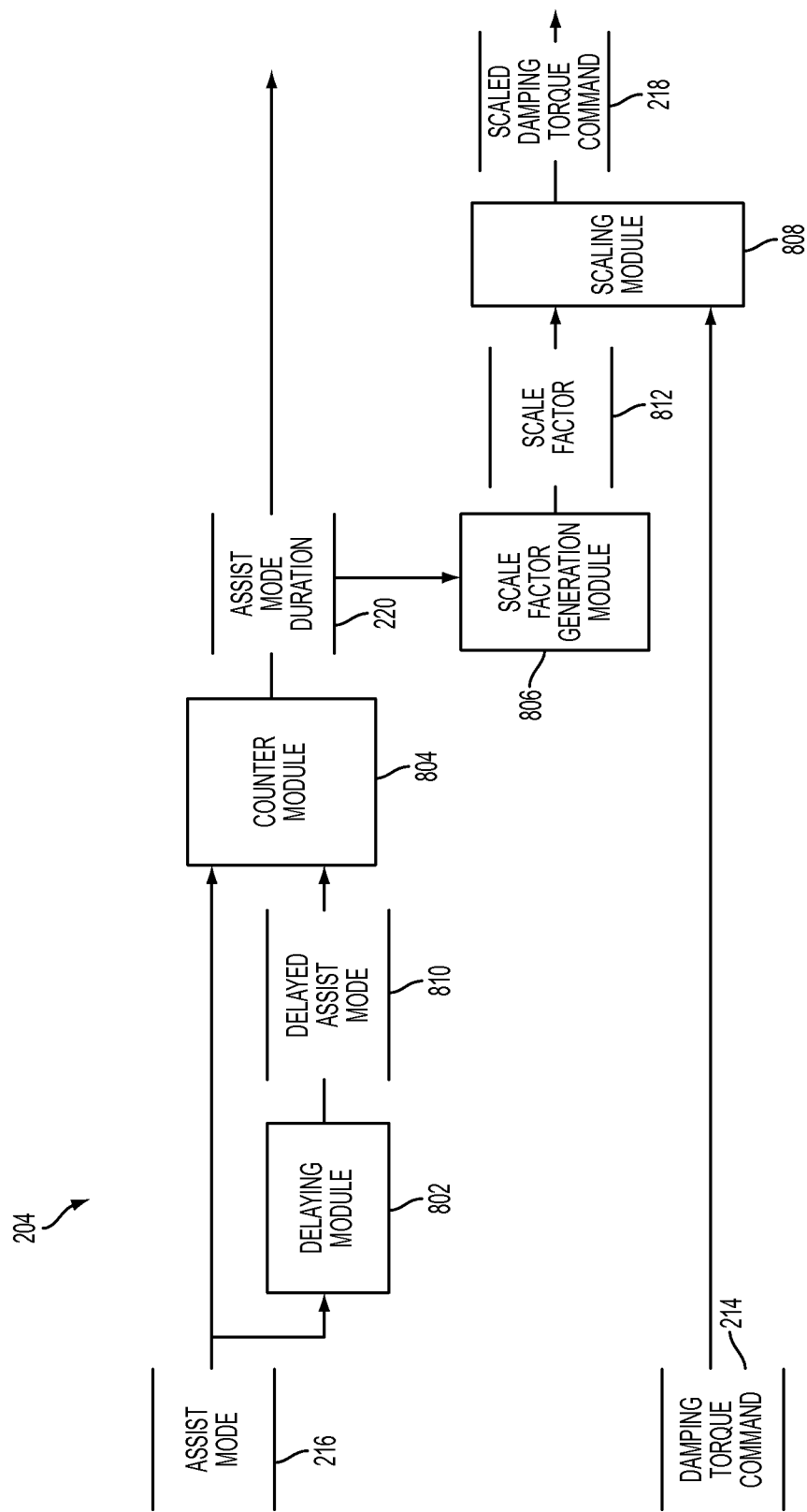
FIG. 8 illustrates a block diagram of a damping torque command scaling module in accordance with exemplary embodiments of the invention.

FIG. 8 depicts a block diagram of the damping torque command scaling module 204 of FIG. 2 in accordance with some embodiments of the invention. The damping torque command scaling module 204 includes one or more sub-modules and datastores such as a delay module 802, a counter module 804, a scale factor generation module 806, and a scaling module 808.

The counter module 804 maintains a duration counter (not shown) that indicates a duration of time for which an assist mode has stayed before changing to another assist mode. The counter module 804 generates the assist mode duration signal 220. Specifically, in some embodiments, the counter module 804 takes as inputs the assist mode signal 216 and a delayed assist mode signal 810. The delayed assist mode signal 810 is the assist mode signal 216 delayed by the delaying module 802, which implements a filter that delays a signal by a certain duration of time (e.g., tens or hundreds of milliseconds). The counter module 804 compares the assist mode signal 216 and the delayed assist mode signal 810 to determine whether the assist mode has been changed. If it is determined that the assist mode has been changed, the counter module 804 resets the duration counter (e.g., to zero) and starts increasing the duration counter. If it is determined that the assist mode has not been changed, the counter module 804 increases the duration counter. In some embodiments, when the duration counter reaches an upper limit, the counter module 804 does not increase the duration counter.

In some embodiments, the counter module 804 resets and increases the duration counter only if the change is from the normal assist mode to the limited assist mode, from the normal assist mode to the manual mode, or from the limited assist mode to the manual mode. In other embodiments, there is no such restriction and a change of the assist mode from any mode to another resets the duration counter.

Figure 9:
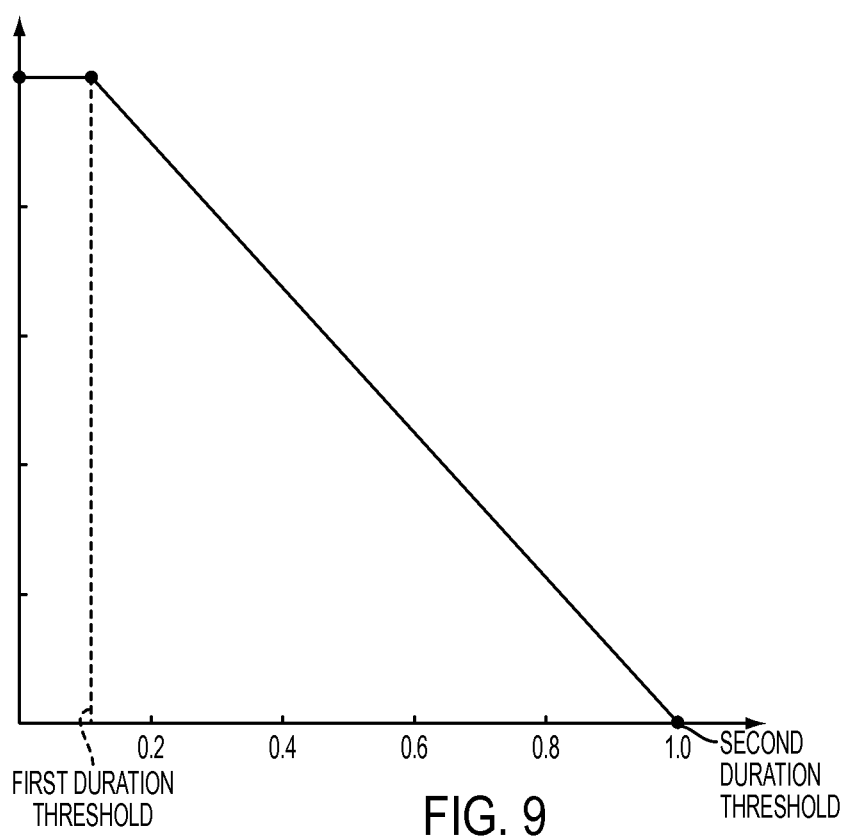
FIG. 9 illustrates a graph that plots an example lookup table in accordance with exemplary embodiments of the invention.

The scale factor generation module 806 generates a scale factor 812 based on the assist mode duration signal 220. The scale factor 812 is used for time-scaling the damping torque command 214. In some embodiments, the scale factor generation module 806 uses a lookup table for the scale factors indexed by the values of the assist mode duration signal 220. FIG. 9 illustrates a graph that plots an example of this lookup table for the scale factors. As shown, the scaling factor is at one (i.e., full damping) for an assist mode duration that is below a first duration threshold (e.g., below about 0.1 second as shown). The scaling factor then decreases as the assist mode duration increases to a second duration threshold (e.g., about 1 second as shown), which is the upper limit of the assist mode duration signal 220. In FIG. 9, the scaling factor changes linearly as the assist mode duration value increases from the first duration threshold to the second duration threshold. However, other non-linear function may define the scaling factor's decrease between the two duration thresholds.

Referring back to FIG. 8, the scaling module 808 scales the damping torque command 214 with the scale factor 810. Because the scale factor 810 is selected based on the assist mode duration, the scaling module 808 scales the damping torque command 214 based on the duration of time that has elapsed since the change of the assist mode to the current assist mode. In addition to time-scaling the damping torque command, the scaling module 808 of some embodiments may also limit the damping torque command between lower and upper damping boundaries that are predefined.

Figure 10:
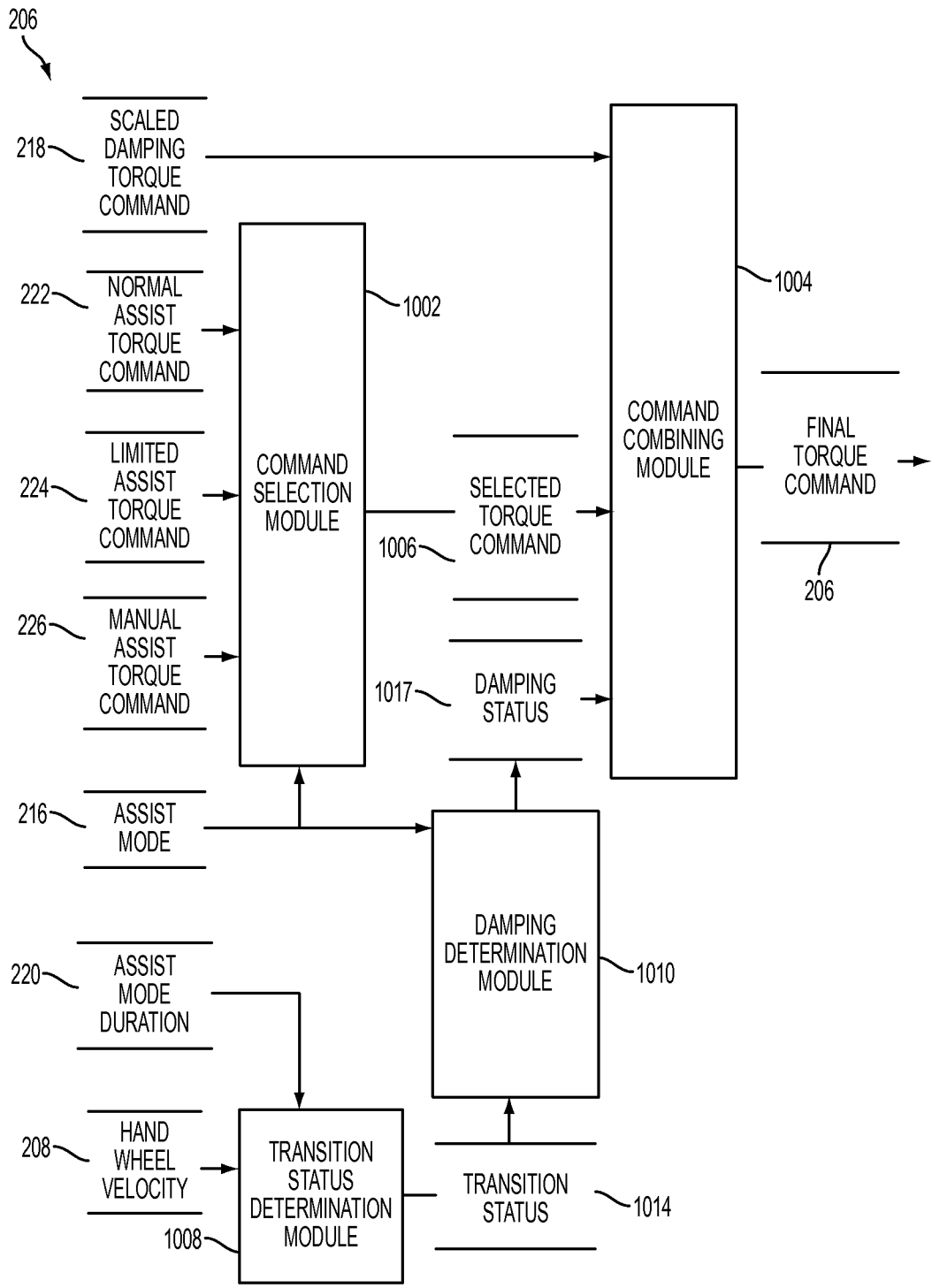
FIG. 10 illustrates a block diagram of a torque command generation module in accordance with exemplary embodiments of the invention.

FIG. 10 depicts a block diagram of the final torque command generation module 206 of FIG. 2 in accordance with some embodiments of the invention. The final torque generation module 206 includes one or more sub-modules and datastores such as a command selection module 1002, a command combining module 1004, a transition status determination module 1008, and a damping determination module 1010.

The command selection module 1002 selects between the normal assist torque command 222, the limited assist torque command 224, and the manual assist torque command 226 based on the assist mode signal 216. That is, the command selection module 1002 selects the normal assist torque command 222 when the assist mode signal 216 indicates the current assist mode is the normal assist mode. The limited assist torque command 224 is selected when the assist mode signal 216 indicates the current assist mode is the limited assist mode. The manual assist torque command, which directs the motor not to generate any assist torque, is generated and selected when the current assist mode is the manual mode. In some embodiments, the command selection module 1002 instantly switches from one torque command to another as the assist mode changes from one mode to another. Alternatively or conjunctively, the command selection module 1002 may progressively reduce (e.g., ramp out) one command (e.g., the normal assist torque command) and progressively increase (e.g., ramp in) the other command (e.g., the limited assist torque command). The command selection module 1002 outputs a selected assist torque command 1006.

The command combining module 1004 combines (e.g., adds) the selected torque command 1006 with the scaled damping torque command 218 when the damping status 1012 indicates that the scaled damping torque command 218 should be combined into the selected torque command 1006.

The command combining module 1004 sends out this combined command as the final torque command 228. When the damping status 1012 indicates that the scaled damping torque command should not be combined into the selected torque command 1006, the command combining module 1004 sends out the selected torque command 1006 as the final torque command 228. The damping status 106 is generated by the damping determination module 1010.

The damping determination module 1010 determines whether to combine the scaled damping torque command 218 into the selected torque command 1006 or not based on the assist mode signal 216, the assist mode duration signal 220, and a transition status signal 1014, which indicates whether a transition from one assist mode to another assist mode should be deemed complete or not. The damping determination module 1010 determines that the scaled damping torque command 218 should be combined into the selected torque command 1006 when (1) the assist mode 216 indicates that the current assist mode is not the normal assist mode and (2) the transition status 1014 indicates that the current transition from one assist mode to another is incomplete. If any of these two conditions is not satisfied, the damping determination module 1010 determines that the scaled damping torque command 218 should not be combined into the selected torque command 1006, effectively disabling the scaled damping torque command 218, and that the selected torque command 1006 should be sent out as the final torque command 228.

The transition status determination module 1008 determines whether a transition from one assist mode to another assist mode should be deemed complete or not. In some embodiments, the transition status determination module 1008 determines that a transition is complete when (1) the assist mode duration 220 is larger than the first duration threshold, which is described above by reference to FIG. 9, and the magnitude (i.e., absolute value) of the hand wheel velocity 208 is less than a hand wheel velocity threshold, or (2) the assist mode duration 220 has reached or at the upper limit. If neither of these two conditions is satisfied, the transition status determination module 1008 determines that a transition is not complete.

Figure 11:
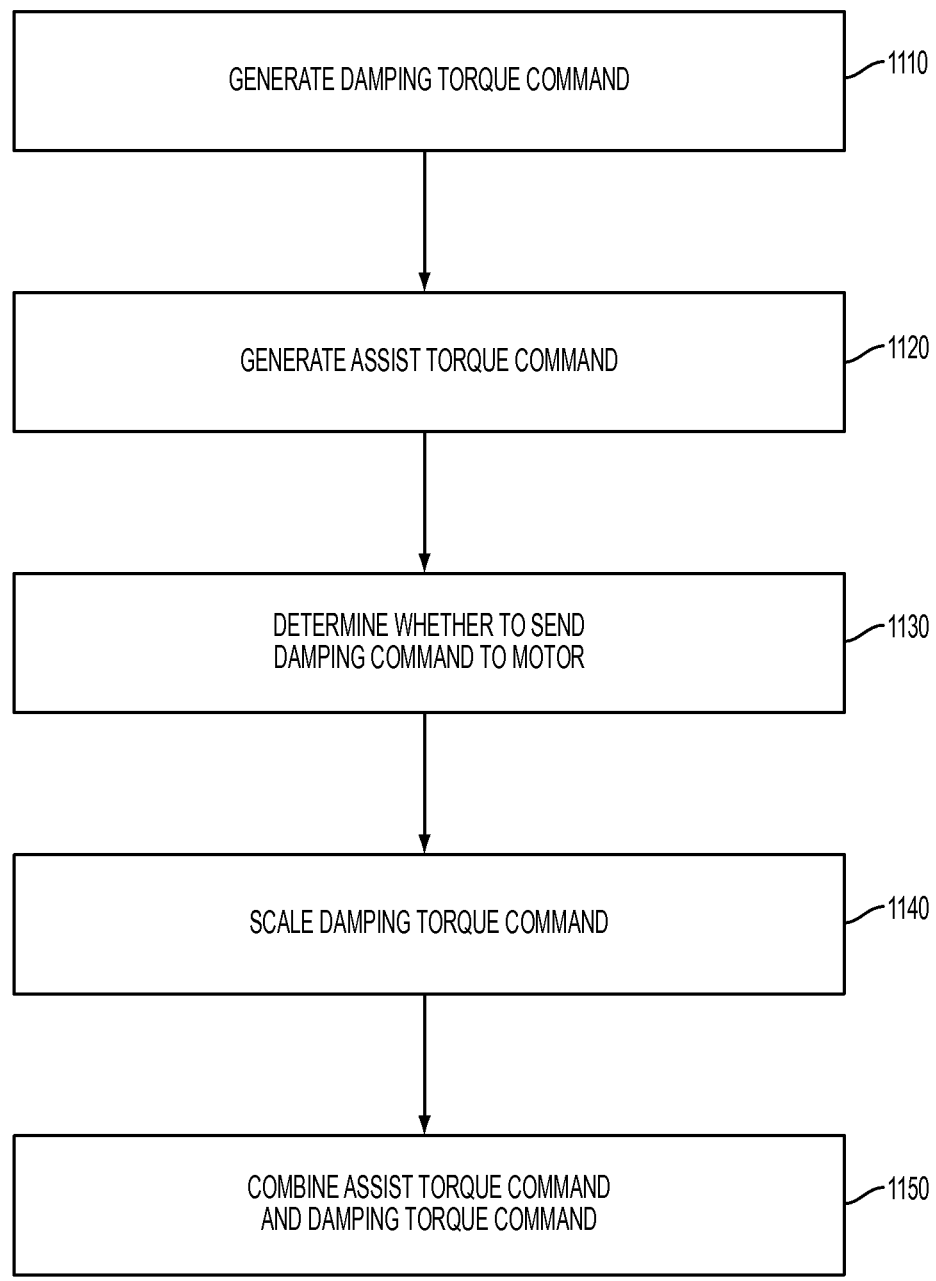
FIG. 11 illustrates a process flow diagram for a method for generating a torque command in accordance with exemplary embodiments of the invention.

FIG. 11 illustrates a process flow diagram for a method for controlling a motor in an electrical power steering system in accordance with exemplary embodiments of the invention. As can be appreciated in light of the disclosure, the order of operation within the method is not limited to the sequential execution as illustrated in FIG. 11, but may be performed in one or more varying orders as applicable and in accordance with the present disclosure. In some embodiments, the method can be scheduled to run based on predetermined events, and/or run continually during operation of the vehicle 10. In some embodiments, the method is performed by the control module 40.

At block 1110, the control module 40 generates a damping torque command for reducing an undesired torque to be generated by the motor. At block 1120, the control module 40 generates an assist torque command that specifies a desired torque to be generated by the motor.

At block 1130, the control module 40 determines whether to send the damping torque command to the motor as a function of a hand wheel velocity and a hand wheel angle. Specifically, the control module 40 determines to send the damping torque command when the hand wheel velocity is less than the hand wheel angle multiplied by a tangent of a tunable phase plane angle and the hand wheel angle is greater than zero, or when the hand wheel velocity is greater than the hand wheel angle multiplied by the tangent of the tunable phase plane angle and the hand wheel angle is less than zero. That is, the control module 40 determines not to send the damping torque command when the hand wheel velocity is greater than the hand wheel angle multiplied by a tangent of a tunable phase plane angle and the hand wheel angle is greater than zero, or when the hand wheel velocity is less than the hand wheel angle multiplied by the tangent of the tunable phase plane angle and the hand wheel angle is less than zero. In some embodiments, the control module 40 may employ one or more filters to filter the hand wheel velocity and the hand wheel angle.

In some embodiments, when the hand wheel velocity is greater than the hand wheel angle multiplied by a tangent of a tunable phase plane angle and the hand wheel angle is greater than zero, or when the hand wheel velocity is less than the hand wheel angle multiplied by the tangent of the tunable phase plane angle and the hand wheel angle is less than zero, the control module 40 scales the damping torque command based on a vehicle velocity of a vehicle that includes the electronic power steering system, and determines to send the damping torque command to the motor. In some embodiments, the control module 40 scales the damping torque command by maintaining a whole of the damping torque command when the vehicle velocity is less than a first velocity threshold, scaling down the damping torque command when the vehicle velocity is greater than equal to the first velocity threshold and is less than a second velocity threshold, and scaling down the damping torque command such that no damping torque is generated by the motor when the vehicle velocity is greater than or equal to the second velocity threshold.

In some embodiments, the control module 40 determines to send the damping torque command when the hand wheel velocity is less than a velocity threshold and the hand wheel angle is greater than an angle threshold, or when the hand wheel velocity is greater than a negative of the velocity threshold and the hand wheel angle is less than a negative of the angle threshold. That is, the control module 40 determines not to send the damping torque command when the hand wheel velocity is greater than a velocity threshold and the hand wheel angle is greater than an angle threshold, or when the hand wheel velocity is less than a negative of the velocity threshold and the hand wheel angle is less than a negative of the angle threshold.

When the hand wheel velocity is greater than a velocity threshold and the hand wheel angle is greater than an angle threshold, or when the hand wheel velocity is less than a negative of the velocity threshold and the hand wheel angle is less than a negative of the angle threshold, the control module 40 of some embodiments scales the damping torque command based on a vehicle velocity of the vehicle 10 (FIG. 1) and determines to send the damping torque command to the motor.

In some embodiments, the control module 40 determines whether to send the damping torque command to the motor. Specifically, the control module 40 determines a current assist mode from a plurality different assist modes that correspond to different operational statuses of the vehicle 10. The control module 40 identifies a change in the current assist mode from a first assist mode of the plurality of different assist modes to a second assist mode of the plurality of different assist modes. The control module determines to send the damping torque command to the motor when (1) a transition from the first assist mode to the second assist mode is deemed incomplete and (2) the current assist mode does correspond to an operational status that indicates an abnormality in the vehicle.

At block 1140, the control module 40 scales the damping torque command. Specifically, the control module 40 determines a current assist mode from a plurality different assist modes that correspond to different operational statuses of a vehicle that includes the electric power steering system. The control module 40 identifies a change in the current assist mode from one of the plurality of different assist modes to another. The control module 40 scales the damping torque command based on a duration of time that has elapsed since the change is identified. The control module 40 scales the damping torque command by maintaining a whole of damping torque command when the duration of time is less than a first duration threshold, scaling down the damping torque command when the duration of time is greater than equal to the first duration threshold and is less than a second duration threshold, and scaling down the damping torque command such that no damping torque is generated by the motor when the duration of time is greater than or equal to the second duration threshold.

At block 1150, the control module 40 combines the assist torque command and the damping torque command to send to the motor if it is determined that the damping torque command is to be sent to the motor. In some embodiments, the control module 40 combines the assist torque command and the damping torque command by adding the assist torque command and the damping torque command.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. For instance, the embodiments of the invention may be applicable to transitions of the assist modes other than the normal, limited, and the manual assist modes described herein. Accordingly, the invention is not to be seen as limited by the foregoing description.

The invention claimed is:

1. A method for controlling a motor in an electrical power steering system, comprising: generating a damping torque command to send to the motor for reducing an undesired torque; generating an assist torque command that specifies a desired torque to be generated by the motor; determining whether to send the damping torque command to the motor as a function of a hand wheel velocity and a hand wheel angle; and combining the assist torque command and the damping torque command to send to the motor only when it is determined that the damping torque command is to be sent to the motor.

2. The method of claim 1, wherein the determining comprises:
   determining to send the damping torque command when the hand wheel velocity is less than a velocity threshold and the hand wheel angle is greater than an angle threshold; and
   determining to send the damping torque command when the hand wheel velocity is greater than a negative of the velocity threshold and the hand wheel angle is less than a negative of the angle threshold.

3. The method of claim 1, wherein the determining comprises, when the hand wheel velocity is greater than a velocity threshold and the hand wheel angle is greater than an angle threshold, or when the hand wheel velocity is less than a negative of the velocity threshold and the hand wheel angle is less than a negative of the angle threshold:
   scaling the damping torque command based on a vehicle velocity of a vehicle that includes the electronic power steering system; and
   determining to send the damping torque command to the motor.

4. The method of claim 1, further comprising:
   determining a current assist mode from a plurality different assist modes that correspond to different operational statuses of a vehicle that includes the electric power steering system;
   identifying a change in the current assist mode from one of the plurality of different assist modes to another; and
   scaling the damping torque command based on a duration of time that has elapsed since the change is identified.

5. The method of claim 4, wherein the scaling comprises:
   maintaining a whole of damping torque command when the duration of time is less than a first duration threshold;
   scaling down the damping torque command when the duration of time is greater than or equal to the first duration threshold and is less than a second duration threshold; and
   scaling down the damping torque command such that no damping torque is generated by the motor when the duration of time is greater than or equal to the second duration threshold.

6. The method of claim 1, wherein the combining the assist torque command and the damping torque command comprises adding the assist torque command and the damping torque command.

7. The method of claim 1, further comprising:
   determining a current assist mode from a plurality different assist modes that correspond to different operational statuses of a vehicle that includes the electric power steering system;
   identifying a change in the current assist mode from a first assist mode of the plurality of different assist modes to a second assist mode of the plurality of different assist modes; and
   determining to send the damping torque command to the motor when a transition from the first assist mode to the second assist mode is deemed incomplete when an assist mode duration is less than a first duration threshold or has reached an upper limit and when the current assist mode corresponds to an operational status that indicates an abnormality in the vehicle.

8. A system of a vehicle comprising: an electrical power steering system that includes a motor; a control module configured to: generate a damping torque command to send to the motor for reducing an undesired torque; generate an assist torque command that specifies a desired torque to be generated by the motor; determine whether to send the damping torque command to the motor as a function of a hand wheel velocity and a hand wheel angle; and combine the assist torque command and the damping torque command to send to the motor only when it is determined that the damping torque command is to be sent to the motor.

9. The system of claim 8, wherein the control module is configured to determine whether to send the damping torque command to the motor by:
   determining to send the damping torque command when the hand wheel velocity is less than a velocity threshold and the hand wheel angle is greater than an angle threshold; and determining to send the damping torque command when the hand wheel velocity is greater than a negative of the velocity threshold and the hand wheel angle is less than a negative angle threshold.

10. The system of claim 8, wherein when the hand wheel velocity is greater than a velocity threshold and the hand wheel angle is greater than an angle threshold, or when the hand wheel velocity is less than a negative of the velocity threshold and the hand wheel angle is less than a negative of the angle threshold, wherein the control module is configured to determine whether to send the damping torque command to the motor by:
scaling the damping torque command based on a vehicle velocity of a vehicle that includes the electronic power steering system; and
determining to send the damping torque command to the motor.

11. The system of claim 8, wherein the control module is further configured to:
determine a current assist mode from a plurality different assist modes that correspond to different operational statuses of a vehicle that includes the electric power steering system;
identify a change in the current assist mode from one of the plurality of different assist modes to another; and
scaling the damping torque command based on a duration of time that has elapsed since the change is identified.

12. The system of claim 11, wherein the scaling comprises:
maintaining a whole of damping torque command when the duration of time is less than a first duration threshold;
scaling down the damping torque command when the duration of time is greater than or equal to the first duration threshold and is less than a second duration threshold; and
scaling down the damping torque command such that no damping torque is generated by the motor when the duration of time is greater than or equal to the second duration threshold.

13. The system of claim 8, wherein the control module is configured to combine the assist torque command and the damping torque command by adding the assist torque command and the damping torque command.

14. The system of claim 8, wherein the control module is further configured to:
determine a current assist mode from a plurality different assist modes that correspond to different operational statuses of a vehicle that includes the electric power steering system;
identify a change in the current assist mode from a first assist mode of the plurality of different assist modes to a second assist mode of the plurality of different assist modes; and
determine to send the damping torque command to the motor when a transition from the first assist mode to the second assist mode is deemed incomplete when an assist mode duration is less than a first duration threshold or has reached an upper limit and when the current assist mode corresponds to an operational status that indicates an abnormality in the vehicle.

15. A method for controlling a motor in an electrical power steering system, comprising:
generating a damping torque command to send to the motor for reducing an undesired torque;
generating an assist torque command that specifies a desired torque to be generated by the motor;
determining whether to send the damping torque command to the motor as a function of a hand wheel velocity and a hand wheel angle; and
combining the assist torque command and the damping torque command to send to the motor when it is determined that the damping torque command is to be sent to the motor, and wherein the determining comprises:
determining to send the damping torque command when the hand wheel velocity is less than the hand wheel angle multiplied by a tangent of a phase plane angle and when the hand wheel angle is greater than zero; and
determining to send the damping torque command when the hand wheel velocity is greater than the hand wheel angle multiplied by the tangent of the phase plane angle and the hand wheel angle is less than zero.

16. A method for controlling a motor in an electrical power steering system, comprising:
generating a damping torque command to send to the motor for reducing an undesired torque;
generating an assist torque command that specifies a desired torque to be generated by the motor;
determining whether to send the damping torque command to the motor as a function of a hand wheel velocity and a hand wheel angle; and
combining the assist torque command and the damping torque command to send to the motor when it is determined that the damping torque command is to be sent to the motor, and wherein the determining comprises, when the hand wheel velocity is greater than the hand wheel angle multiplied by a tangent of a phase plane angle and the hand wheel angle is greater than zero, or when the hand wheel velocity is less than the hand wheel angle multiplied by the tangent of the phase plane angle and the hand wheel angle is less than zero:
scaling the damping torque command based on a vehicle velocity of a vehicle that includes the electronic power steering system, determining to send the damping torque command to the motor.

17. The method of claim 16, wherein the scaling comprises:
maintaining a whole of the damping torque command when the vehicle velocity is less than a first velocity threshold;
scaling down the damping torque command when the vehicle velocity is greater than or equal to the first velocity threshold and is less than a second velocity threshold; and
scaling down the damping torque command such that no damping torque is generated by the motor when the vehicle velocity is greater than or equal to the second velocity threshold.

18. A system of a vehicle comprising:
an electrical power steering system that includes a motor;
a control module configured to:
generate a damping torque command to send to the motor for reducing an undesired torque;
generate an assist torque command that specifies a desired torque to be generated by the motor;
determine whether to send the damping torque command to the motor as a function of a hand wheel velocity and a hand wheel angle; and combine the assist torque command and the damping torque command to send to the motor when it is determined that the damping torque command is to be sent to the motor; and wherein the control module is configured to determine whether to send the damping torque command to the motor by:

determining to send the damping torque command when the hand wheel velocity is less than the hand wheel angle multiplied by a tangent of a phase plane angle and the hand wheel angle is greater than zero; and determining to send the damping torque command when the hand wheel velocity is greater than the hand wheel angle multiplied by the tangent of the phase plane angle and the hand wheel angle is less than zero.

19. A system of a vehicle comprising:

an electrical power steering system that includes a motor;

a control module configured to:
  generate a damping torque command to send to the motor for reducing an undesired torque;
  generate an assist torque command that specifies a desired torque to be generated by the motor;
  determine whether to send the damping torque command to the motor as a function of a hand wheel velocity and a hand wheel angle; and
  combine the assist torque command and the damping torque command to send to the motor when it is determined that the damping torque command is to be sent to the motor; and wherein when the hand wheel velocity is greater than the hand wheel angle multiplied by a tangent of a phase plane angle and the hand wheel angle is greater than zero, or when the hand wheel velocity is less than the hand wheel angle multiplied by the tangent of the phase plane angle and the hand wheel angle is less than zero, the control module is configured to determine whether to send the damping torque command to the motor by:
  scaling the damping torque command based on a vehicle velocity of a vehicle that includes the electronic power steering system; and
  determining to send the damping torque command to the motor.

20. The system of claim 19, wherein the scaling comprises:
  maintaining a whole of the damping torque command when the vehicle velocity is less than a first velocity threshold;
  scaling down the damping torque command when the vehicle velocity is greater than or equal to the first velocity threshold and is less than a second velocity threshold; and
  scaling down the damping torque command such that no damping torque is generated by the motor when the vehicle velocity is greater than or equal to the second velocity threshold.

* * * * *